Dec. 23, 1930.  G. D. BRADSHAW  1,785,931

FLUID SEPARATOR

Filed Aug. 8, 1927

INVENTOR:
Grant D. Bradshaw
By E. J. Andrews
Atty.

Patented Dec. 23, 1930

1,785,931

UNITED STATES PATENT OFFICE

GRANT D. BRADSHAW, OF PITTSBURGH, PENNSYLVANIA, ASSIGNOR TO BLAW-KNOX COMPANY, OF BLAWNOX, PENNSYLVANIA, A CORPORATION OF NEW JERSEY

FLUID SEPARATOR

Application filed August 8, 1927. Serial No. 211,286.

This invention relates to fluid separators, and particularly those used for purifying gases such as steam by separating from the gases liquid particles and other impurities. It has for one of its objects providing means for increasing the efficiency and capacity of the separators by reducing the tendency of the water chambers and passageways of the separator to overflow or become clogged, and a particular object is to provide improved means for the passage of air, steam or other gases from the water passageways, and pipes and collecting chambers so as to prevent interference with the free flow of the water or other liquids.

Although the invention is applicable to various types of separators used for various purposes, yet for the purpose of illustrating my invention I have described it as applied to steam separators used for drying and purifying the steam in boilers, and particularly to that type of separator known by the trade as "Tracyfiers."

Figure 1:
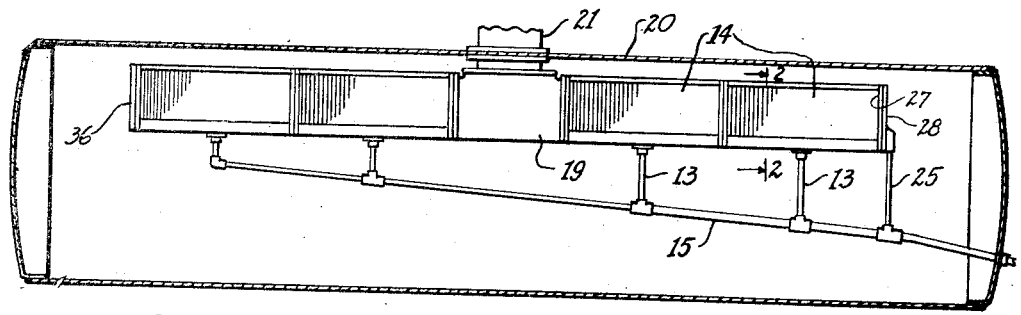
Figure 2:
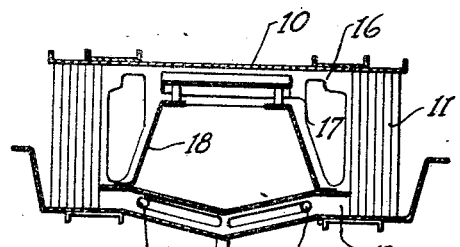
Figure 3:
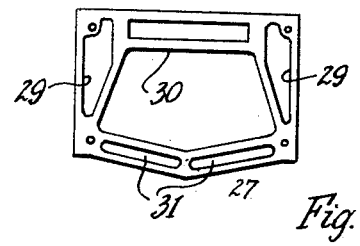
Figure 4:
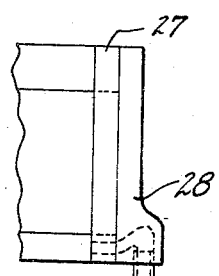
Figure 5:
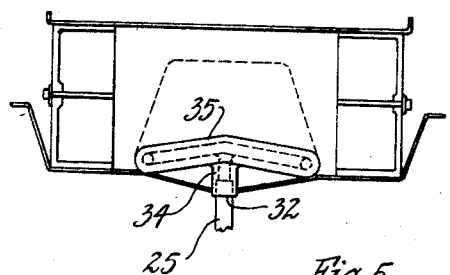

Of the accompanying drawings Fig. 1 is an elevation of a separator mounted in a boiler, which embodies the features of my invention; Fig. 2 is an enlarged transverse sectional view of the separator along the line 2—2 of Fig. 1; Fig. 3 is an elevation of one of the end plates of one of the sections of the separator; Fig. 4 is an edge elevation of the end plate and a supplemental end plate which embodies the features of my invention; and Fig. 5 is an elevation of the end of the separator showing the supplemental end plate.

The separator which I have illustrated in describing my invention comprises a casing 10 which is open on the sides and has positioned in the side openings baffles 11. The steam which is to be purified passes through these baffles and the moisture contained therein passes downwardly into the water passageway 12 and thence into a drain pipe 13. Ordinarily the separator comprises a number of sections 14, each arranged as hereinabove described, and each having a drain pipe 13 which communicates with the manifold drain pipe 15. The water in this pipe is ordinarily carried outside of the boiler and disposed of in any suitable manner.

The steam passing through the baffles 11 enters a steam chamber 16 and from this chamber passes through inlets 17 into an inner conduit 18 from which it flows to the outlet T 19 of the boiler 20 and thence to the steam main 21 of the boiler system.

It is customary in separator systems of this kind to provide means for preventing air or steam from clogging up the drain pipes 13 or 15 or the steam trap to which the water is delivered. For this purpose a vent pipe 25 is provided which connects with the drain pipe system either directly to the manifold 15 or to the trap to which the water is delivered by the manifold. This vent pipe is connected to the separator at some convenient point, ordinarily with the water passageway 12. Ordinarily this pipe enters this chamber in the bottom thereof, and extends upwardly to near the upper portion of the chamber. But I have found it desirable to connect the vent pipe 25 directly with the end plate 28 of the separator. In this way the installation of the vent pipe is more conveniently produced and the venting of the manifold or trap is more effectively provided for.

Ordinarily on the end of each section 14 there is an end plate 27. This end plate has steam openings 29 and 30 and water openings 31, so that the steam and water can flow freely from one section to the other. At the extreme ends of the entire separator there are ordinarily blank end plates 36 which entirely close the steam and water openings in the section end plates 27. Although the vent pipe 25 may be connected in various ways with the blank end plate, I prefer to provide for this purpose a special plate 28, which is adapted to be fixed in the usual or in any suitable manner to the standard end plate 27 of the section, closing the openings 29, 30 and 31. But I provide in this end plate an inlet 32 to a passageway 34 and 35 which communicates with the openings 31. The vent pipe 25 is threaded into the opening 32, thus providing communicating passageways between the manifold 15 and the water passageways 31 of the end plate, so that any entrained steam or air may pass up from the pipe 15 into the passageways 12 of the separator, thus preventing any interference of this steam or air from the free flow of the water from the manifold or the trap. It will be understood, however, that the vent pipe 25 would perform a similar service if directly connected to the trap instead of being connected with the manifold.

By this means I provide a very convenient way of attaching the vent pipe to the standard end plate of the separator; and the passageways 35 by which the vent pipe communicates with the water chamber 12 are elevated somewhat above the chamber so that any clogging of the vent pipe by the water which may accumulate in the water chamber is eliminated.

Although I have illustrated and described two end plates 27 and 28, Fig. 4, in forming the communicating passageways between the vent pipe 25 and the water passageways of the separator, yet it is to be understood that these two plates could be made integral or that modifications could be formed with a single thickness plate, and other modifications could be made in the various details which I have set forth, by those skilled in the art, without departing from the spirit of my invention as set forth in the following claims.

I claim as my invention:

1. A fluid separator comprising a water chamber, a drain pipe communicating with said chamber, an end plate mounted in one end of the separator and having two openings therethrough communicating with said chamber, a second end plate having a forked passageway therein, said second plate being fixed to said first mentioned plate with the branches of the forked passage communicating with the respective openings, and means providing communication between said drain pipe and said forked passageway.

2. A fluid separator as claimed in claim 1 in which a portion of said forked passageway is elevated above said two openings.

3. A fluid separator comprising a water chamber, a drain pipe, an end plate mounted in one end of the separator and having an opening therethrough, said opening communicating with said chamber, and means operatively communicating with said opening and said drain pipe.

4. A fluid separator comprising a water chamber, means closing one end of said chamber and having an opening therethrough, a drain pipe communicating with said chamber, and a vent pipe associated with said drain pipe and communicating with said opening.

5. A fluid separator having a water chamber and a steam chamber, a drain pipe operatively communicating with said water chamber, an end plate mounted on one end of said separator and providing a closing wall for said chambers, said wall having an opening therethrough communicating with one of said chambers, and vent means operatively connecting said opening and said drain pipe.

6. A fluid separator, comprising a plurality of sections, connecting means between the adjacent ends of two adjacent sections, said sections and connecting means having communicating water passageways, and communicating drain pipes connected respectively with all of said passageways, and a vent pipe connecting said drain pipe with one of said passageways.

In testimony whereof, I hereunto set my hand.

GRANT D. BRADSHAW.